United States Patent [19]

Mauchan

[11] Patent Number: 5,381,198
[45] Date of Patent: Jan. 10, 1995

[54] ADAPTOR FOR INSTANT CAMERA

[75] Inventor: Donald E. Mauchan, Marlboro, Mass.

[73] Assignee: Polaroid Corporation, Cambridge, Mass.

[21] Appl. No.: 152,960

[22] Filed: Nov. 15, 1993

Related U.S. Application Data

[63] Continuation-in-part of Ser. No. 803,101, Dec. 5, 1991, Pat. No. 5,262,808.

[51] Int. Cl.⁶ ............................................. G03B 17/24
[52] U.S. Cl. .................................. 354/108; 354/277; 354/296
[58] Field of Search ........................ 354/105–109, 354/295, 296, 126, 145.1, 149.11, 277

[56] References Cited

U.S. PATENT DOCUMENTS

| | | | |
|---|---|---|---|
| 4,717,930 | 1/1988 | Wheeler | 354/108 |
| 4,764,782 | 8/1988 | Wheeler | 354/109 |
| 5,181,059 | 1/1993 | Mauchan | 354/108 |

Primary Examiner—Howard B. Blankenship
Attorney, Agent, or Firm—John J. Kelleher

[57] ABSTRACT

There is presented an adaptor for attachment to an instant camera to enable the camera to produce an exposed film unit having indicia imprinted thereon during photographic exposure of the film unit. The adaptor includes a face plate and attachment structure extending therefrom for releasably connecting the adaptor to the camera. The face plate has provision therein for a lens orifice adapted to be in alignment with the camera objective lens opening, a view finder orifice adapted to be in alignment with the camera view finder window, and a light source orifice adapted to be off-set from alignment with the camera light source. A side of the face plate adapted to be opposed to face surfaces of the camera is provided with a light reflective surface. Light from the camera light source is in part intercepted by and reflected from the adaptor reflective surface and directed thereby to the camera objective lens opening.

19 Claims, 9 Drawing Sheets

ADAPTOR FOR INSTANT CAMERA

CROSS-REFERENCE TO RELATED APPLICATION

This is a continuation-in-part of U.S. patent application Ser. No. 07/803,101, U.S. Pat. No. 5,262,808, filed Dec. 5, 1991 in the name of Donald E. Mauchan.

BACKGROUND OF THE INVENTION

1. Field of the Invention

The invention relates to photography and is directed more particularly to an adaptor for use with an instant camera for producing imprint indicia on film when the film is exposed, the adaptor acting to reflect light from the camera's artificial light source to the camera's objective lens during the exposure of the film.

2. Description of the Prior Art

It often is desirable to have imprinted on a photograph graphics which identify the source of the photograph, or the occasion on which the photograph was taken, or the place in which the photograph was taken, or political or commercial messages. The concept of having indicia automatically printed directly on the face of the photograph at the time the film unit is exposed is discussed in U.S. Pat. No. 4,717,930, issued Jan. 5, 1988 to Alton Do Wheeler. Wheeler discloses mounting a template so as to overlie the dark slide of a film pack inside an instant camera. The only internal change in structure is the overlying template, which is transparent with opaque indicia. The template thus screens a part of the underlying film unit from light entering the camera objective lens, while exposing the remainder of the film unit. Wheeler further discloses a structural unit, external of the camera, which is mounted in front of a source of artificial illumination and channels light into the camera to modify the background portion of the photograph surrounding the object to be photographed, and on which the indicia is to appear.

In U.S. Pat. No. 4,764,782, issued Aug. 16, 1988 to Alton D. Wheeler, there are disclosed adaptors for known instant cameras which permit the use of the cameras to produce composite photographs. The adaptors are easily mounted on and removed from the cameras, such that the cameras may be used selectively for conventional photography and for producing composite photographs. The adaptors, referred to by Wheeler as "diffusers", each comprise a block of clear plastic material. The diffusers are provided with a single orifice therein, adapted to be aligned with the camera objective lens.

U.S. Patent No. 5,181,059, issued Jan. 19, 1993 to Donald E. Mauchan, discloses a reflector mounted on the front of a conventional instant camera within the field illuminated by the source of artificial light. The reflector of Mauchan is so located and configured as to reflect some of the light from the source of artificial illumination to the camera lens. Thus, the light from the reflector, in addition to the light from the object, causes exposure of portions of the film underlying transparent portions of a template, of the type described above, defining the indicia even through the area in question, in the lens viewing field, may be dark. The reflector comprises an elongated, relatively narrow reflective surface. Accordingly, the light reflected into the lens is necessarily rather limited.

There is a need for a reflective unit to be used in conjunction with a standard instant camera, which unit is capable of reflecting a relatively large amount of light to the camera lens, is inexpensive to manufacture, easy to use, and light in weight so as not to unduly disturb the balance of the camera. There is further a need for such a reflector unit of a substantially "disposable" nature, that is, of extremely low cost and suitable for use at social or political or business gatherings, or the like, and thereafter discarded.

SUMMARY OF THE INVENTION

It is, therefore, an object of the invention to provide an adaptor for attachment to standard instant cameras, the adaptor providing a reflective surface substantially as large in area as the face of the camera, less the film cassette compartment.

A further object of the invention is to provide such an adaptor as is inexpensive to manufacture, and therefore inexpensive to the consumer. A related object is to provide an adaptor so inexpensive as to be subject to "disposable" usage.

A further object of the invention is to provide such an adaptor as is easy to use, the proper use thereof being substantially apparent from the appearance of the adaptor and requiring only minimal written instructions.

A still further object of the invention is to provide such an adaptor as is light in weight relative to the weight of the camera, such that the "feel" and balance of the camera is not noticeably affected thereby.

With the above and other objects in view, as will hereinafter appear, a feature of the present invention is the provision of an adaptor for attachment to an instant camera to enable the camera to produce an exposed film unit having indicia imprinted thereon during photographic exposure of the film unit. The camera has, in the face surfaces thereof, an objective lens, a view finder window, and a light source. The adaptor includes a face plate and attachment structure extending from the face plate and adapted to releasably connect the adaptor to the camera. The face plate has therein provision for a lens orifice adapted to be in alignment with the camera objective lens when the adaptor is connected to the camera, a view finder orifice adapted to be in alignment with the camera view finder window when the adaptor is connected to the camera, and a light source orifice adapted to be in part off-set from the camera light source when the adaptor is connected to the camera. A side of the face plate which is adapted to be opposed to the camera face surfaces when the adaptor is connected to the camera is provided with a light reflective surface, such that light from the camera light source is in part directed to the reflective surface and directed thereby to the camera objective lens.

In accordance with a further feature of the invention, the adaptor comprises a unitary molded plastics member having arms extending therefrom and adapted to releasably interlock with a portion of the camera.

In accordance with a still further feature of the invention, the adaptor comprises a unitary paperboard member having the aforesaid face plate as a central portion thereof, and side wall portions extending from the central face plate portion. The paperboard member is provided with score lines defining boundaries between the face plate portion and the side wall portions such that the member may be bent along the score lines to position the side wall portions generally normal to the face plate portion. The side wall portions are provided with means for connection of the member to the camera.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of the invention may be employed in various and numerous embodiments without departing from the scope of the invention.

BRIEF DESCRIPTION OF THE DRAWINGS

Reference is made to the accompanying drawings in which are shown illustrative embodiments of the invention from which its novel features and advantages will be apparent. In the drawings.

DESCRIPTION OF THE PREFERRED EMBODIMENTS

Figure 1:
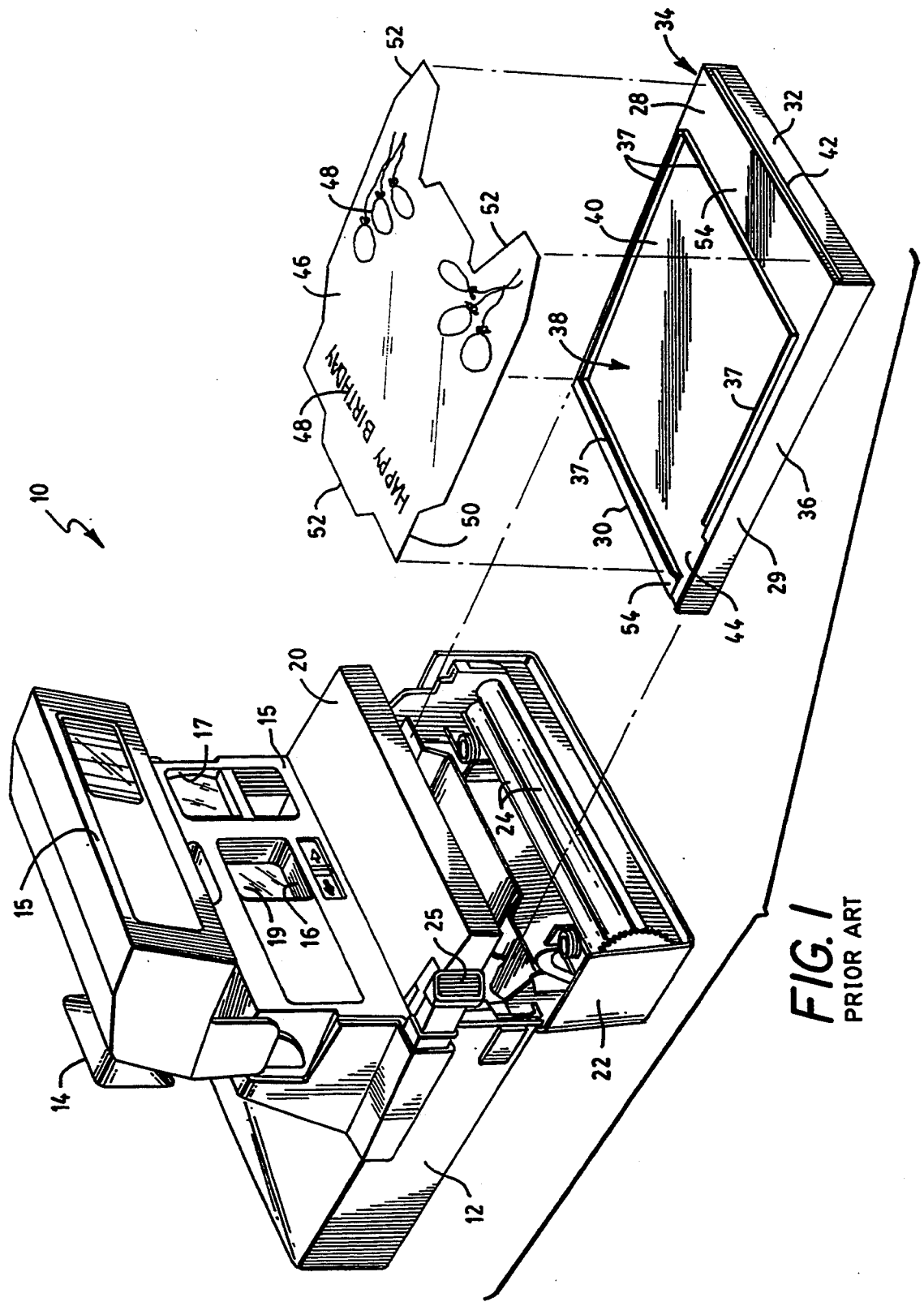
FIG. 1 is an exploded view of a prior art camera, film cassette and template for use in production of photographs having thereon superimposed graphics.

Referring to FIG. 1, it will be seen that a known camera 10 includes a lighttight housing 12 having an eye piece 14 extending rearwardly therefrom. On front face surfaces 15 of the camera 10 there is disposed an objective lens opening 16, a view finder window 17, and an artificial light source 18.

Figure 2:
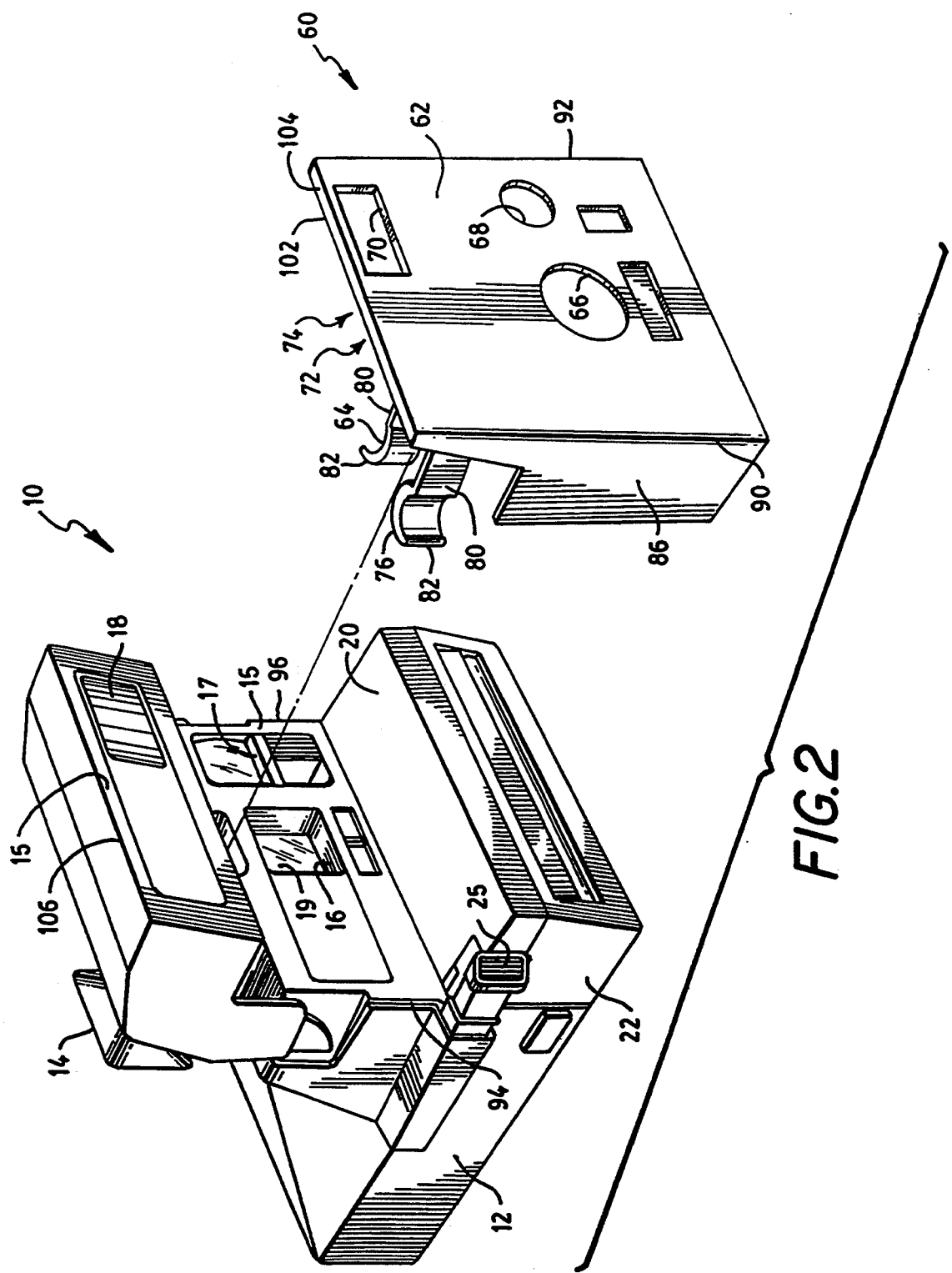
FIG. 2 is an exploded view of the camera of FIG. 1 and an adaptor, illustrative of one embodiment of the invention, the adaptor shown removed from the camera.
Figure 3:
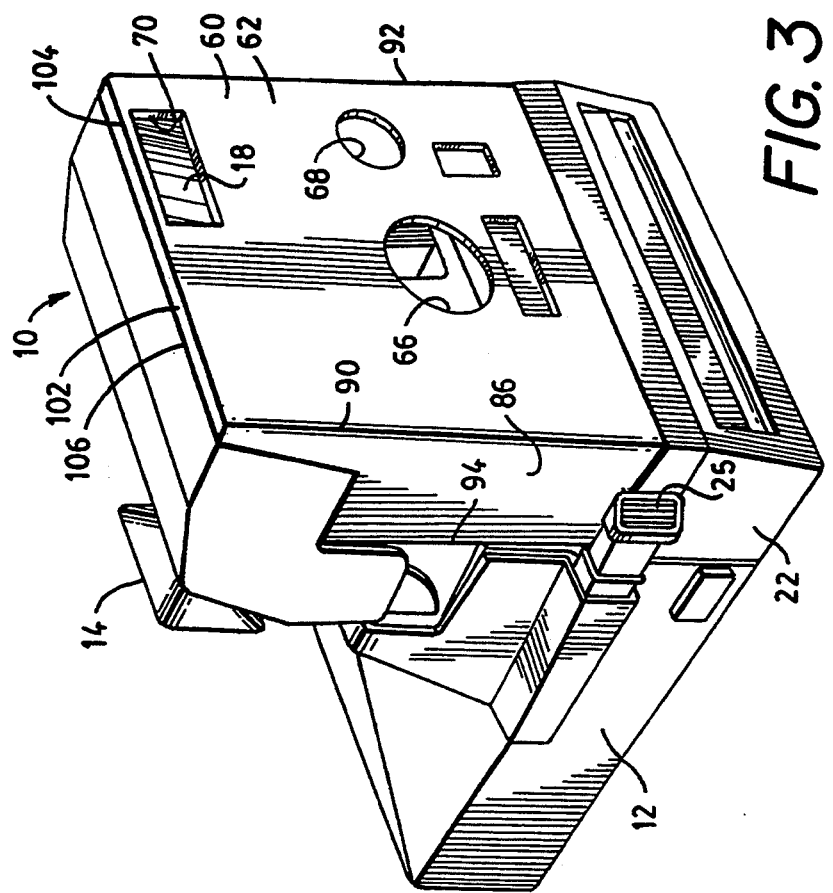
FIG. 3 is similar to FIG. 2, but shows the adaptor mounted on the camera.
Figure 4:
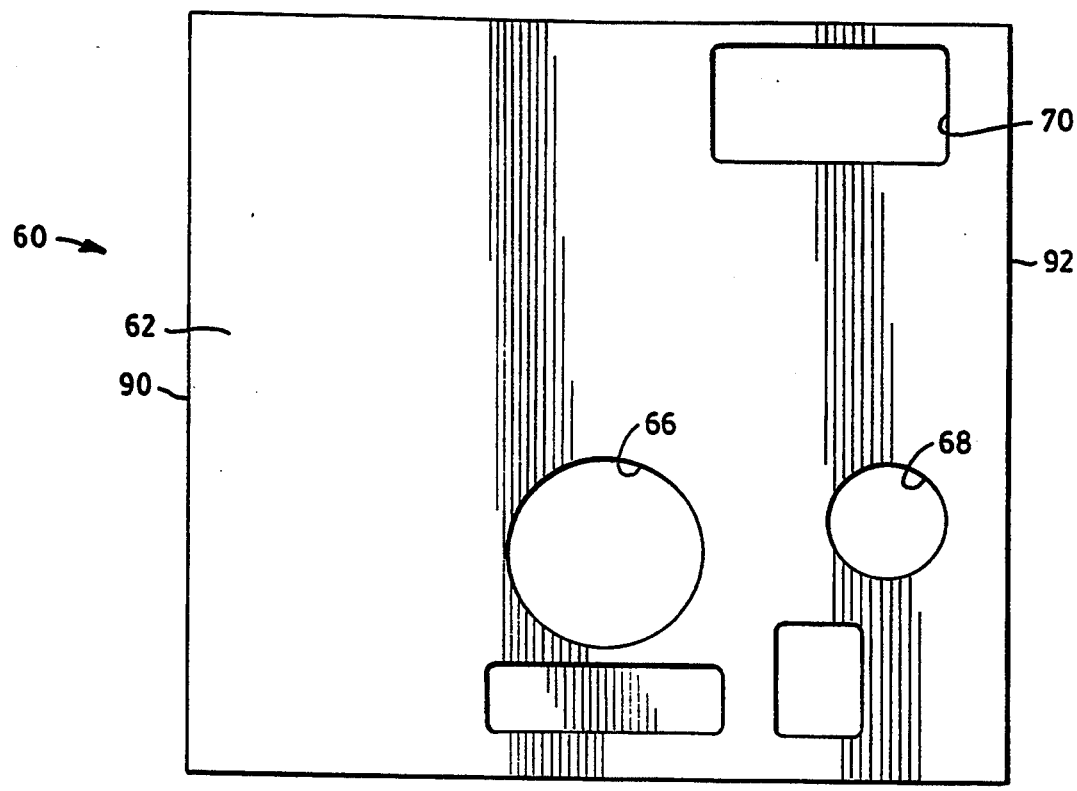
FIG. 4 is a front elevational view of the adaptor of FIGS. 2 and 3.
Figure 5:
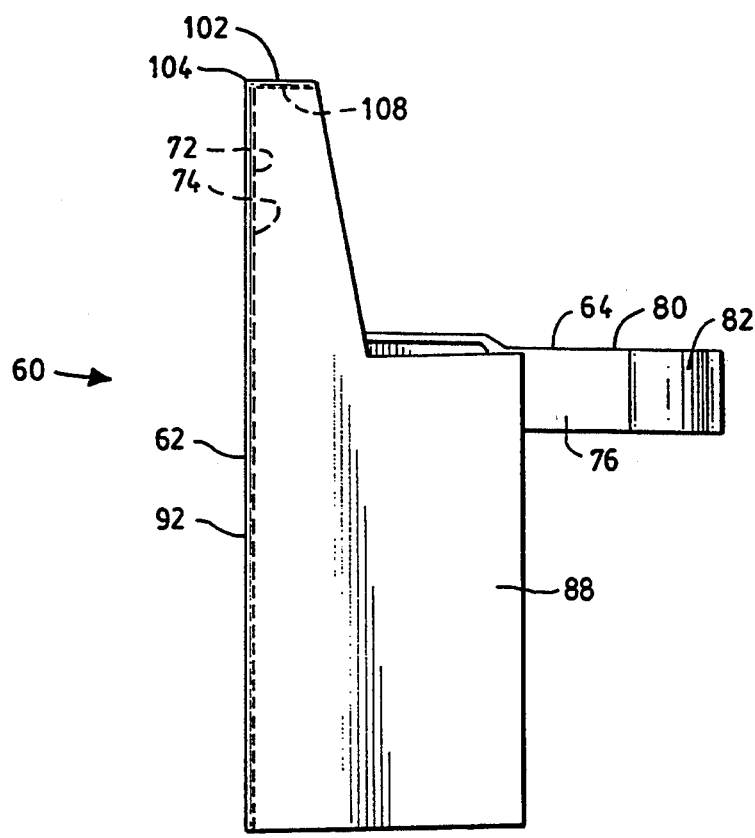
FIG. 5 is a side elevational view of the adaptor of FIG. 4.

The housing 12 includes a forwardly extending apron 20 projecting below and beyond the lens 16. A film cassette loading door 22 includes a pair of hinges for hinged movement of the door from its closed position (FIG. 2) to its open loading position (FIG. 1). The loading door 22 carries a pair of rollers 24 which are adapted to rupture a container of processing liquid located on an end of an exposed film unit and spread its contents between layers of the film unit to initiate the formation of a visible image therein, while simultaneously advancing the film unit to the exterior of the camera.

The internal parts of the camera within the housing are conventional and are not shown. Such parts include a shutter which may be activated by an external button 25 on the housing 12. Activation of the camera by pressing the shutter button 25 causes the artificial light source 18 to flash and the shutter to open for a predetermined period of time. Light from the artificial source 18 travels to an object to be photographed and is reflected back from the object, through the lens opening 16, to an objective lens 19 (FIG. 14) and thence to a reflex mirror 21 in the camera housing 12 and onto the surface of the film unit.

Referring again to FIG. 1, it will be seen that a known film cassette 28 includes a generally rectangular frame 29 having a trailing end wall 30, a leading end wall 32, and side walls 34 and 36. An upwardly extending flange 37 substantially defines four sides of an exposure aperture 38. The film cassette 28 includes a resilient platen which supports a stack of film units 40 in position to receive the reflected light from the mirror within the camera housing.

A slot 42 in the leading end wall 32 of the film cassette 28 allows the uppermost film unit 40 to be ejected from the film cassette 28 by a pick which moves longitudinally through a gap 44 between the trailing end wall 30 and the side wall 36 into engagement with a trailing edge of the exposed film unit. The pick (not shown) is conventional and is used initially to remove a dark slide at the top of the stack of film units when the cassette is initially inserted into the camera housing and the loading door 22 is closed. After the dark slide is removed, the uppermost film unit 40 is properly oriented and in position within the cassette 28 to receive light via the exposure aperture 38.

As is known in the art, the film cassette 28 may be adapted to receive a template 46. The template is generally transparent but with opaque portions defining indicia 48 to be imprinted on the film unit. The template 46 is dimensioned to fit within the exposure aperture 38, but not in the area of the gap 44. The template 46 may be provided with a cutout 50 for providing clearance for the camera's pick, or film advancing means. The template 46 may be provided with tabs 52 which may be slid under planar top portions 54 of the cassette frame 29 outboard of the upwardly extending flange 37, to hold the template in place.

Referring to FIGS. 2-8, it will be seen that in one illustrative embodiment the adaptor 60 of the present invention comprises an opaque face plate 62 with attachment structure 64 extending from the face plate and adapted to releasably connect the adaptor 60 to the camera 10. The face plate 62 has therein a lens orifice 66 adapted to be in alignment with the camera objective lens opening 16 when the adaptor 60 is connected to the camera 10, a view finder orifice 68 adapted to be in alignment with the camera view finder window 17 when the adaptor is connected to the camera, and a light source orifice 70 adapted to be in part off-set from the camera light source 18 when the adaptor is connected to the camera.

A side 72 of the face plate 62 adapted to be opposed to the camera face surfaces 15 when the adaptor 60 is connected to the camera 10 is provided with a light reflective surface 74.

The adaptor 60 preferably is a unitary molded plastics member and the attachment structure 64 comprises arm means 76 molded integrally with the adaptor 60, extending from the side 72 of the face plate 62 and adapted to releasably interlock with a portion 78 (FIG. 8) of the camera 10. The arm means 76 preferably comprises a pair of opposed arms 80 having barbs 82 on the free ends thereof adapted to snap into locking engagement with the camera portion 78 which may comprise a post 84.

Figure 6:
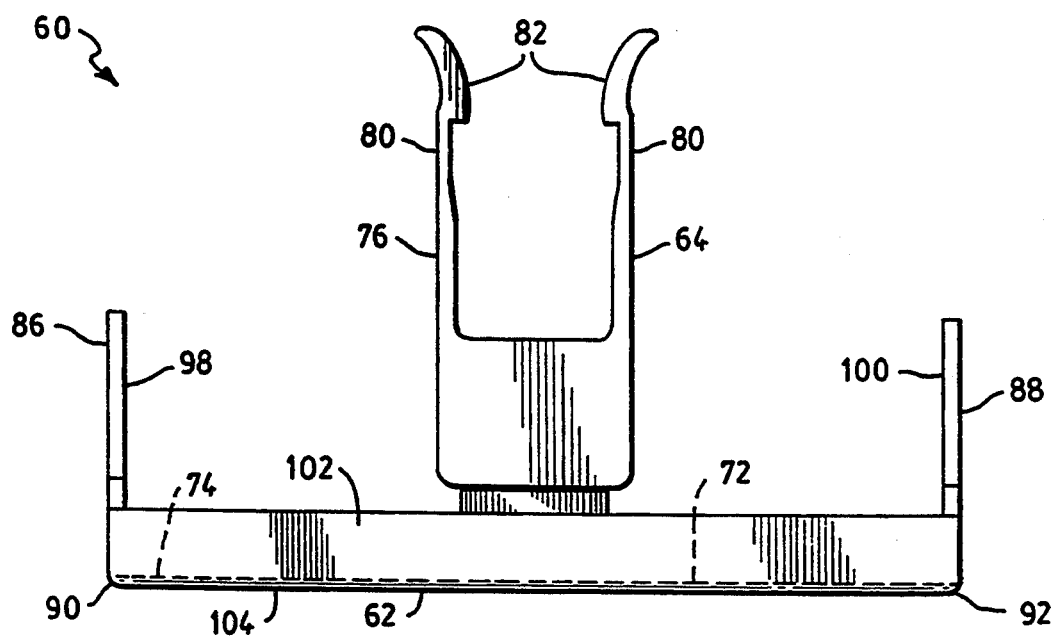
FIG. 6 is a top plan view of the adaptor of FIG. 4.

The adaptor 60 further includes opaque side walls 86, 88 extending, respectively, from side edges 90, 92 of the face plate 62 and adapted to fill space between side edges 94, 96 (FIG. 2) of the camera 10 and the adaptor face plate 62, when the adaptor 60 is connected to the camera 10. The side walls 86, 88 are provided with opposed light reflective surfaces 98, 100 (FIG. 6).

The adaptor 60 still further includes an opaque top wall 102 extending from a top edge 104 of the face plate 62 and adapted to fill space between a top edge 106 of one of the camera face surfaces 15 and the adaptor face plate 62 when the adaptor is connected to the camera 10. The top wall 102 preferably is provided with a light reflective surface 108. Thus, when the adaptor 60 is connected to the camera 10, a light chamber 110 (FIG. 14) is formed by the adaptor face plate 62, side walls 86, 88, top wall 102, the camera apron 20, and the camera front face surfaces 15. The face plate 62, side walls 86, 88, and top wall 102 are each provided with a reflective surface 74, 98, 100 and 108, respectively, interiorly of the light chamber 110. The reflective surface may be a white enamel painted on the appropriate adaptor surfaces.

Figure 7:
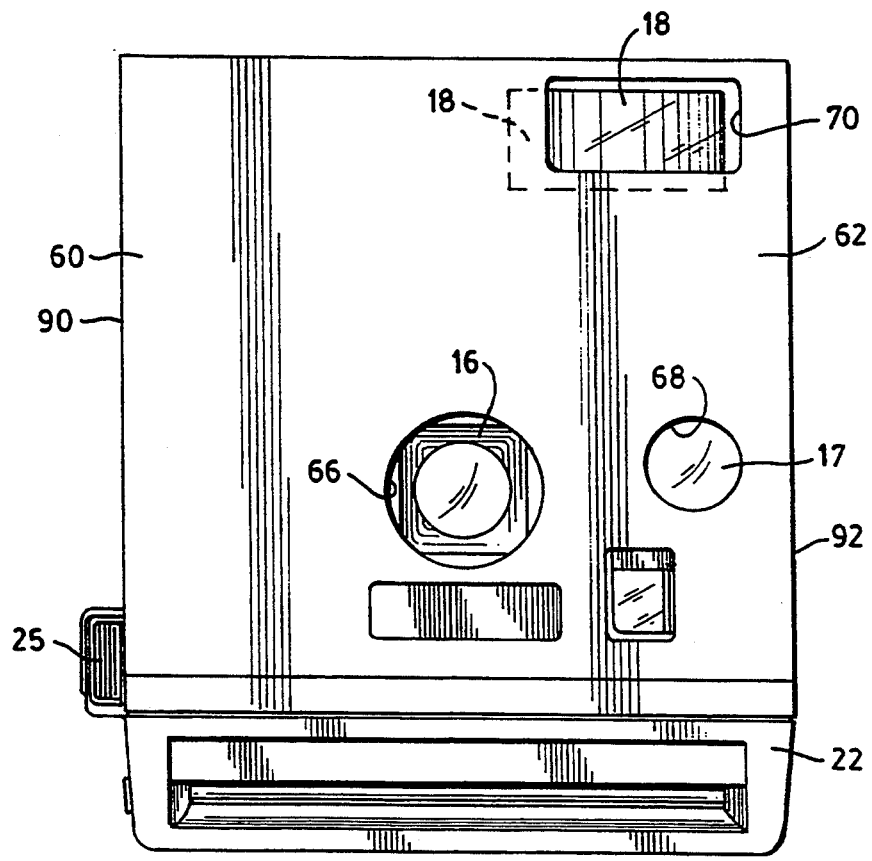
FIG. 7 is a front elevational view of the camera and adaptor of FIG. 3.
Figure 8:
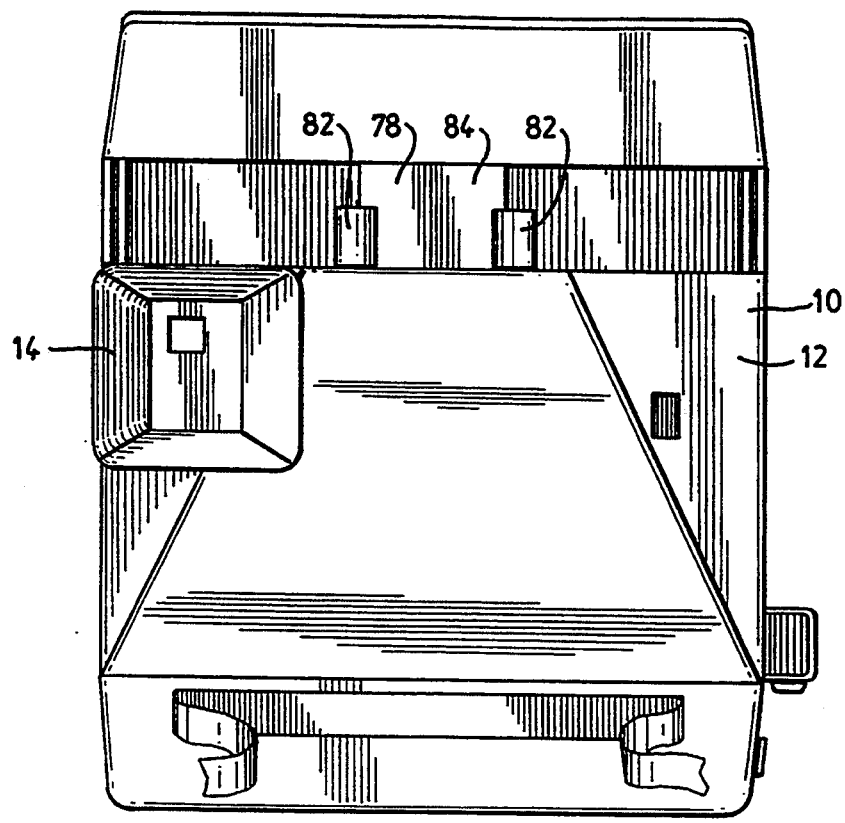
FIG. 8 is a rear elevational view of the camera and adaptor of FIG. 3.
Figure 14:
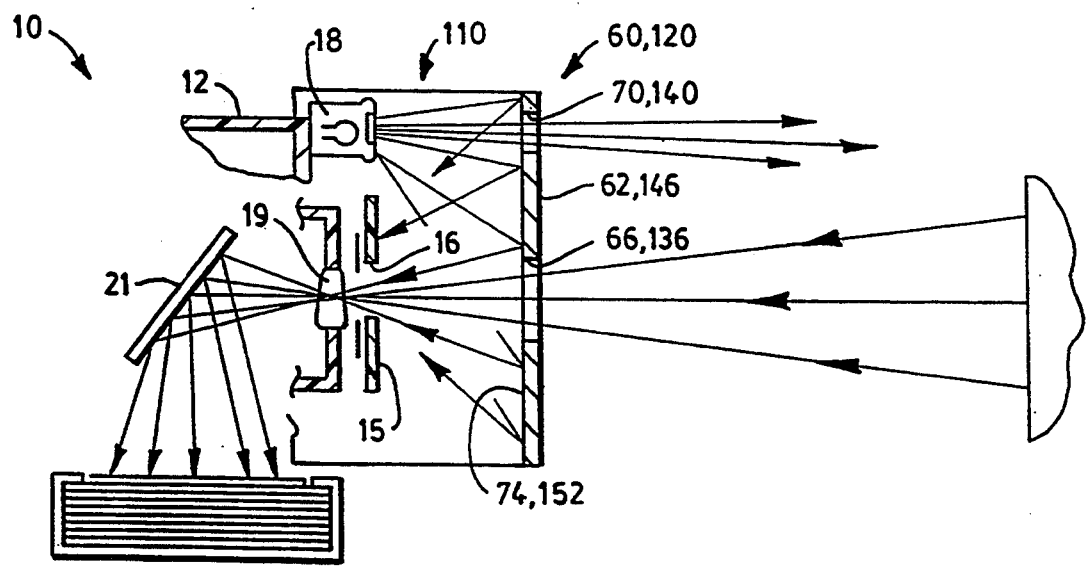
FIG. 14 is a diagrammatic illustration of light travel in operation of a camera and adaptor in accordance with the invention.

In operation, the adaptor 60 is snapped onto the camera 10 having the film cassette 28 and template 46 of FIG. 1 therein. Activation of the light source 18 causes light to travel in a straight line through the light source orifice 70 and to the object being photographed. As shown in FIG. 7, the adaptor light source orifice 70 is off-set from the camera light source 18, such that upon activation of the light source 18, light emitted therefrom is in part intercepted by the face plate reflective surface 74 and directed inwardly of the light chamber 110 and generally toward the lens 19. Light rays directed toward the sides and top of the light chamber 110 are reflected by the reflective surfaces 98, 100, 108 back into the chamber and towards the lens 19. Thus, light in addition to that reflected in a straight line by the object to the lens 19, is directed by the adaptor to the lens, and thence to the reflex mirror 21, through the exposure aperture 38, and to the template 46 and uppermost film unit 40 (FIG. 14). Rays of the adaptor reflected light pass through the lens 19 as diffused non-image bearing light and are directed through the template 46 so as to reproduce the indicia 48 thereon on peripheral portions of the film unit 40.

In FIGS. 9–13, there is shown an alternative embodiment of the adaptor which is extremely low-cost and which may be discarded after a photographic event.

Figure 9:
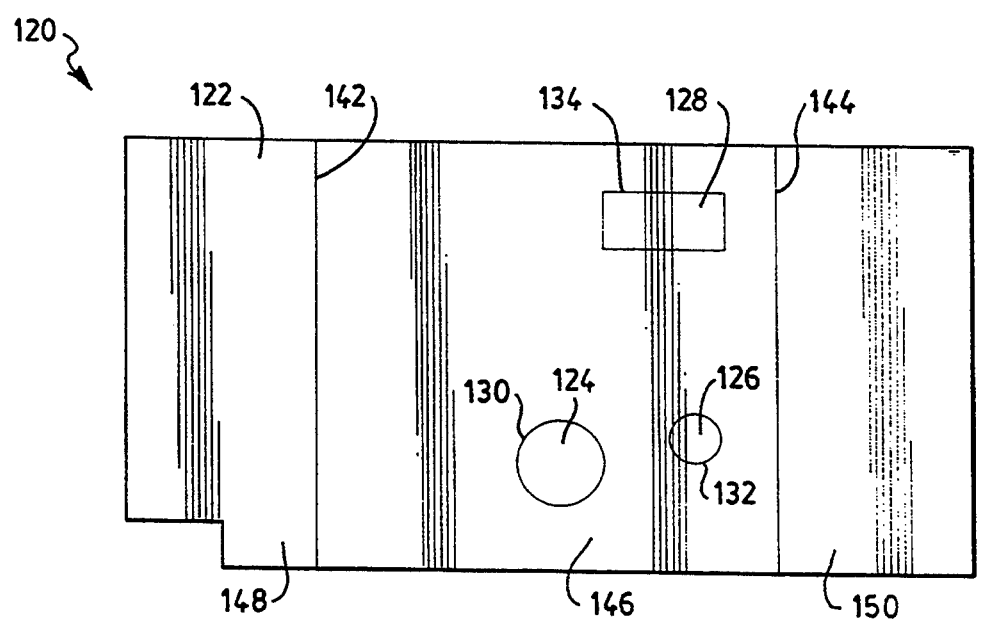
FIG. 9 is a planer view of a paperboard blank comprising an adaptor and illustrative of an alternative embodiment of the adaptor.
Figure 10:
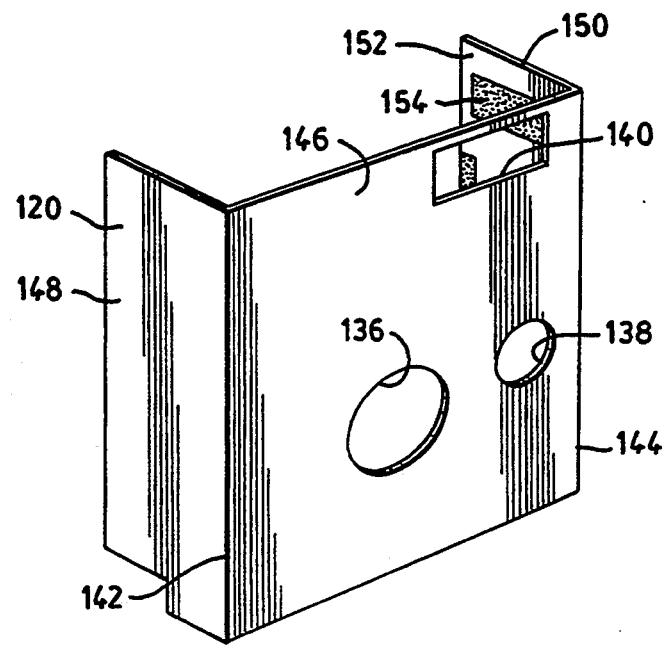
FIG. 10 is a frontal perspective view of the blank of FIG. 9 folded and punched to provide an adaptor.
Figure 11:
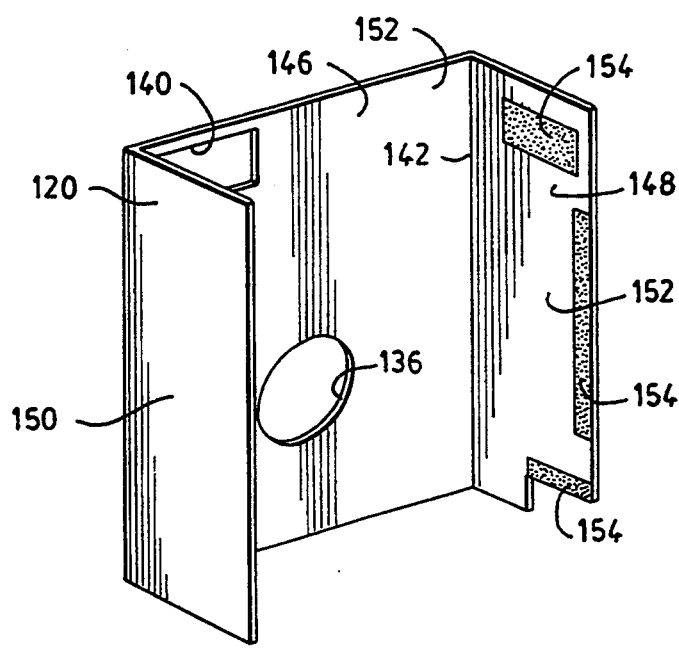
FIG. 11 is a rearward perspective view of the adaptor of FIG. 10.
Figure 12:
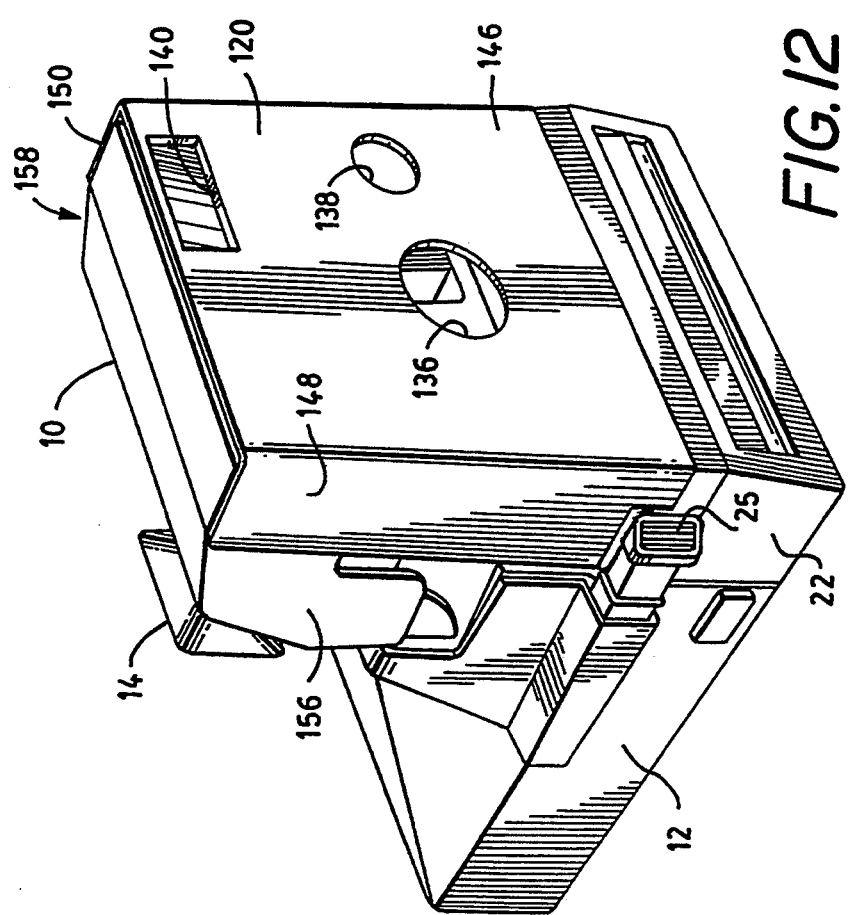
FIG. 12 is a perspective view showing the adaptor of FIGS. 10 and 11 mounted on the camera of FIG. 1.
Figure 13:
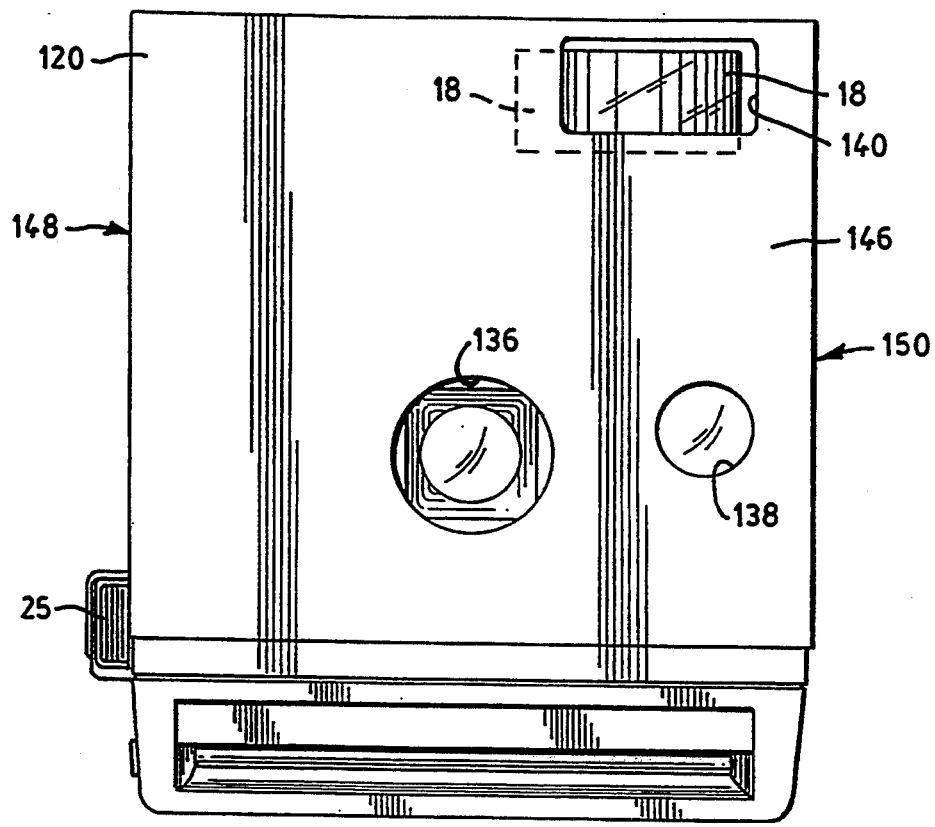
FIG. 13 is a front elevational view of the camera and adaptor of FIG. 12.

The alternative adaptor 120 may be provided in the form of a paperboard blank 122, shown in FIG. 9, having first, second and third "punch-outs" 124, 126, 128 that is, portions of the blank surrounded by weakened score lines 130, 132, 134, respectively. Application of pressure upon the punch-out 124 causes the punch-out 124 to part from the blank 122 along the score line 130, to produce a lens orifice 136. Similarly, application of pressure upon the punch-out 126 causes the punch-out 126 to part from the blank 122 along the score line 132, to produce a view finder orifice 138, and application of pressure upon the punch-out 128 causes the punch-out 128 to part from the blank 122 along the score line 134 to produce a light source orifice 140. Pressure may be applied to the punch-outs by a finger of an operator, The blank is further provided with a pair of parallel score lines 142, 144 which are adapted to facilitate easy bending of the paperboard along those lines. After removal of the punchouts 124, 126, 128, and bending of the paperboard along the score lines 142, 144, the adaptor 120 assumes the configuration shown in FIGS. 10 and 11, having a central face portion 146 and two side portions 148, 150. The face portion 146 and the side portions 148, 150 are each provided with a light reflective surface 152 which may be one continuous light-reflective paperboard surface, or a continuous layer of white paper, or the like. The side portions are each provided with a tacky coating or tape 154 which, when pressed against side portions 156, 158 of the camera 10 will adhere the adaptor to the camera, but which permit the adaptor readily to be peeled off the camera.

When the adaptor 120 is attached to the camera 10 (FIG. 12), the adaptor lens orifice 136 is aligned with the camera objective lens opening 16, and the adaptor view finder orifice 138 is aligned with the camera view finder window 17. However, as may be seen in FIG. 13, the adaptor light source orifice 140 is not in alignment with the camera light source 18, but rather, is off-set from the light source 18. As in the case of the adaptor first embodiment, the off-set of the light source orifice 140 causes interception of a portion of the light from the camera light source 18 by the reflective surface 152 of the adaptor face portion 146, resulting in part of the light source output being reflected back into the lens 19.

The operation of the system including the alternative adaptor is substantially the same as the operation with respect to the first embodiment of adaptor.

It is to be understood that the present invention is by no means limited to the particular constructions herein disclosed and/or shown in the drawings, but also comprises any modifications or equivalents within the scope of the claims.

Having thus described my intention, what I claim as new and desire to secure by Letters Patent of the United States is:

1. An adaptor for attachment to an instant camera to enable said camera to produce an exposed film unit having indicia imprinted thereon during photographic exposure of said film unit, said camera having in face surfaces thereof an objective lens opening, a view finder window, and a light source, said adaptor comprising an opaque face plate, attachment structure extending from said face plate and adapted to releasably connect said adaptor to said camera, said face plate having therein provision for a lens orifice adapted to be in alignment with said camera objective lens opening when said adaptor is connected to said camera, a view finder orifice adapted to be in alignment with said camera view finder window when said adaptor is connected to said camera, and a light source orifice adapted to be off-set from alignment with said camera light source when said adaptor is connected to said camera, a side of said face plate adapted to be opposed to said camera face surfaces when said adaptor is connected to said camera having thereon a light reflective surface, whereby light from said camera light source is in part directed to said reflective surface and directed thereby to said camera objective lens opening.

2. The adaptor as defined in claim 1 wherein said adaptor comprises a unitary molded plastics member.

3. The adaptor as defined in claim 2 wherein said attachment structure comprises arm means extending from said side of said face plate and adapted to releasably interlock with a portion of said camera.

4. The adaptor as defined in claim 3 wherein said arm means comprises a pair of opposed arms adapted to snap into interlocking engagement with said portion of said camera.

5. The adaptor as defined in claim 2 wherein said provision for a lens orifice, a view finder orifice, and a light source orifice in said face plate comprises a lens orifice, a view finder orifice, and a light source orifice in said face plate.

6. The adaptor as defined in claim 2 wherein said adaptor further comprises side walls extending, respectively, from side edges of said face plate and adapted to fill space between side edges of said camera face surfaces and said adaptor face plate when said adaptor is connected to said camera.

7. The adaptor as defined in claim 6 wherein said side walls are provided with opposed light reflective surfaces.

8. The adaptor as defined in claim 6 wherein said adaptor further comprises a top wall extending from a top edge of said face plate and adapted to fill space between a top edge of one of said camera face surfaces and said adaptor face plate when said adaptor is connected to said camera.

9. The adaptor as defined in claim 8 wherein said side walls and said top wall are provided with light reflective surfaces.

10. The adaptor as defined in claim 1 wherein said adaptor comprises a unitary paperboard member having said face plate as a central portion thereof and first and second side wall portions, score lines defining boundaries between said face plate and said first and second side wall portions, respectively, and facilitating bending of said member along said lines to position said side wall portions generally normal to said face plate portion.

11. The adaptor as defined in claim 10 wherein said provision for a lens orifice, a view finder orifice, and a light source orifice in said face plate comprises punch-out portions of said paperboard member, whereby upon effecting removal of said punch-out portions said face plate is provided with lens, view finder, and light source orifices.

12. The adaptor as defined in claim 10 wherein said attachment structure comprises attachment means on said side wall portions adapted for removable connection to said camera.

13. The adaptor as defined in claim 12 wherein said attachment means comprises tacky portions of said side wall portions, said tacky portions being disposed so as to be engageable with side surfaces of said camera.

14. The adaptor as defined in claim 10 wherein said side wall portions are provided with light reflective surfaces which comprise continuations of said face plate light reflective surface.

15. In combination, a camera having a housing for enclosing a film cassette containing a film unit, a lens opening in said housing to admit light to expose said film unit, a light source in said housing to illuminate an object to be photographed, a template containing indicia mounted in said housing intermediate said lens opening and said film unit, and an opaque light reflecting adaptor;

said opaque adaptor being attached to said housing and including a light reflecting surface spaced from said light source and from said lens opening in a direction toward said object to be photographed, said light reflecting surface including at least first and second orifices, said first orifice being aligned with said lens opening and said second orifice being off-set from alignment with said light source; said first and second orifices, lens opening and light source being so located that a straight line from said light source through said second orifice to said object to be photographed allows a straight line of reflected light from said object to pass through said first orifice and said lens opening, said light reflecting surface being configured to reflect a portion of the light from said light source toward said housing, a fraction of said reflected portion passing through said lens opening into said housing and through said template to impinge on said film unit.

16. Photographic apparatus comprising, in combination:

a camera having a housing for receiving a film cassette containing at least one film unit, a lens, and a light source for illuminating an object to be photographed;

a film assemblage including a film cassette having an exposure aperture therein, and at least one film unit;

a template having indicia on peripheral portions thereof which is adapted to be reproduced on said film unit during an exposure cycle, said template being adapted to be located in alignment with and between said film unit and said exposure aperture in said film cassette; and an opaque adaptor having first and second major opposite sides, said first side having a reflective surface and means for defining at least first and second orifices in said opaque adaptor, and means for releasably attaching said opaque adaptor to said camera such that said reflective surface is facing said lens and said light source with said first orifice being located in alignment with said lens and said second orifice being off-set from alignment with said light source, whereby during an exposure cycle 1) a portion of the light emitted by said light source passes through said second orifice and is reflected by the object being photographed back toward said camera as image bearing light where it passes through said first orifice, said lens, and said template before striking said film unit and exposing a generally central portion thereof and 2) another portion of the emitted light directly strikes said reflective surface of said opaque adaptor and is reflected by the facing surfaces of said camera and said reflective surface until rays of the reflected light pass through the lens as diffused non-image bearing light and are directed through said template so as to reproduce said indicia on peripheral portions of said film unit.

17. A process for taking photographs comprising providing a camera, a film cassette containing at least one film unit, a template, and an opaque adaptor, providing indicia on said template, said film cassette including means forming an exposure aperture, mounting said template in alignment with said exposure aperture whereby light entering said film cassette through said exposure aperture passes through said template before striking said film unit, inserting said film cassette into said camera, said camera including a lens opening and a light source, forming first and second orifices in said opaque adaptor, attaching said opaque adaptor to said camera with said second orifice spaced from and off-set from alignment with said light source, aligning said first orifice with said lens opening, forming a light reflecting surface on said opaque adaptor and attaching said opaque adaptor to said camera with said light reflecting surface facing toward said camera, actuating said light source and opening the lens opening to allow light from said light source (1) to travel in a straight line from said light source through said second orifice to an object to be photographed and back in a straight line from said object through both said first orifice aligned with said lens opening and said lens opening into said camera and (2) to impinge on said light reflecting surface of said opaque adaptor and be reflected before passing through said lens opening into said camera, and directing light from said lens opening through said template and onto said film unit.

18. A process for taking photographs comprising providing a camera, a film cassette containing at least one film unit, a template, and an opaque adaptor, providing indicia on said template, said film cassette including means forming an exposure aperture, mounting said template in alignment with said exposure aperture whereby light entering said film cassette through said exposure aperture passes through said template before striking said film unit, inserting said film cassette into said camera, said camera including a lens opening and a light source, taking said adaptor as a flat piece and forming score lines in said piece, folding said piece along said score lines to form said adaptor into a U-shape with the light reflecting surface comprising the inner portion of the U, forming first and second orifices in said adaptor, attaching said adaptor to said camera with said second orifice spaced from and off-set from alignment with said light source, aligning said first orifice with said lens opening, forming a light reflecting surface on said adaptor and attaching said adaptor to said camera with said light reflecting surface facing toward said camera, actuating said light source and opening the lens opening to allow light from said light source (1) to travel in a straight line from said light source through said second orifice to an object to be photographed and back in a straight line from said object through both said first orifice aligned with said lens opening and said lens opening into said camera and (2) to impinge on said light reflecting surface of said opaque adaptor and be reflected at least once before passing through said lens opening into said camera, and directing light from said lens opening through said template and onto said film unit.

19. A process for taking photographs comprising providing a camera, a film cassette containing at least one film unit, a template, and a light reflecting adaptor, providing indicia on said template, said film cassette including means forming an exposure aperture, mounting said template in alignment with said exposure aperture whereby light entering said film cassette through said exposure aperture passes said template before striking said film unit, inserting said film cassette into said camera, said camera including a lens opening and a light source, forming first and second orifices in said adaptor by forming score lines in said adaptor of desirable shapes and sizes, and punching said scored shapes from said adaptor, attaching said adaptor to said camera with said second orifice spaced from and off-set from alignment with said light source, aligning said first orifice with said lens opening, forming a light reflecting surface on said adaptor and attaching said adaptor to said camera with said light reflecting surface toward said camera, actuating said light source and opening the lens opening to allow light from said light source (1) to travel in a straight line from said light source through said second orifice to an object to be photographed and back in a straight line from said object through both said first orifice aligned with said lens opening and said lens opening into said camera and (2) to impinge on said light reflecting surface of said adaptor and be reflected at least once before passing through said lens opening into said camera, and directing light from said lens opening through said template and onto said film unit.

* * * * *